(12) United States Patent
Soderstrom et al.

(10) Patent No.: US 10,494,185 B2
(45) Date of Patent: Dec. 3, 2019

(54) ADJUSTABLE MAGNETIC GRID FOR CONVEYOR SYSTEM

(71) Applicant: AMF Automation Technologies, LLC, Tucker, GA (US)

(72) Inventors: Kristopher Jon Soderstrom, Lawrenceville, GA (US); Chi Chung, Smyrna, GA (US)

(73) Assignee: AMF AUTOMATION TECHNOLOGIES, LLC, Tucker, GA (US)

( * ) Notice: Subject to any disclaimer, the term of this patent is extended or adjusted under 35 U.S.C. 154(b) by 0 days.

(21) Appl. No.: 15/260,594

(22) Filed: Sep. 9, 2016

(65) Prior Publication Data

US 2017/0073165 A1    Mar. 16, 2017

Related U.S. Application Data

(60) Provisional application No. 62/216,472, filed on Sep. 10, 2015.

(51) Int. Cl.
*B65G 17/46* (2006.01)
*B65G 17/34* (2006.01)

(52) U.S. Cl.
CPC ............ *B65G 17/46* (2013.01); *B65G 17/34* (2013.01); *B65G 2207/08* (2013.01); *B65G 2207/48* (2013.01)

(58) Field of Classification Search
CPC ............... B65G 17/34; B65G 2207/08; B65G 2207/48; B65G 17/46

USPC ........ 198/468.5, 472.1, 867.04, 803.6, 690.1
See application file for complete search history.

(56) References Cited

U.S. PATENT DOCUMENTS

| | | | |
|---|---|---|---|
| 4,586,601 A * | 5/1986 | Hodlewsky | B65G 17/46 198/690.1 |
| 4,805,761 A * | 2/1989 | Totsch | B65G 54/02 104/156 |
| 4,836,360 A | 6/1989 | Kasik | |
| 4,972,941 A | 11/1990 | Kasik | |
| 5,056,654 A | 10/1991 | Kasik | |
| 5,147,033 A | 9/1992 | Kasik | |
| 5,188,216 A | 2/1993 | Smith et al. | |
| 5,579,897 A | 12/1996 | Kasik | |
| 5,649,619 A | 7/1997 | Kasik | |
| 5,871,084 A | 2/1999 | Kasik | |
| 6,913,137 B2 | 7/2005 | Hamilton et al. | |
| 7,114,614 B2 | 10/2006 | Hamilton et al. | |
| 7,410,048 B2 * | 8/2008 | Verduijn | B65G 21/2009 198/841 |
| 7,762,386 B2 | 7/2010 | Allore | |
| 8,434,613 B2 * | 5/2013 | Ozaki | B65G 17/46 198/690.1 |

(Continued)

FOREIGN PATENT DOCUMENTS

JP           54113172 A  *  9/1979

*Primary Examiner* — Mark A Deuble
(74) *Attorney, Agent, or Firm* — Gardner Groff & Greenwald, PC

(57) ABSTRACT

An adjustable magnetic grid assembly is provided in a conveyor system. The magnetic grid assembly eliminates wear and tear on metal pans placed on the grid and transported through the conveyor system. Locations of magnets in the magnetic grid assembly are adjustable to accommodate metal pans of different sizes and configurations.

9 Claims, 7 Drawing Sheets

(56) References Cited

U.S. PATENT DOCUMENTS 8,550,235 B2   10/2013  Suderman
2016/0221758 A1*  8/2016  Bogle ................... B65G 17/40

* cited by examiner

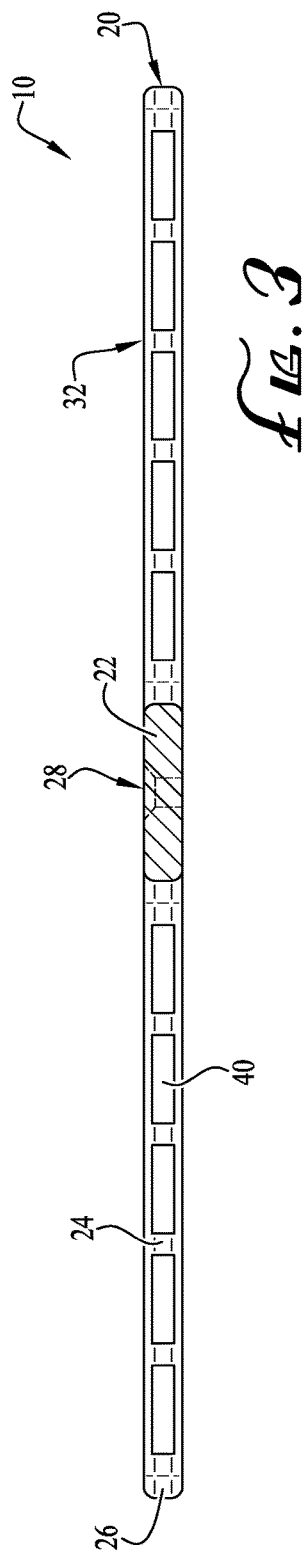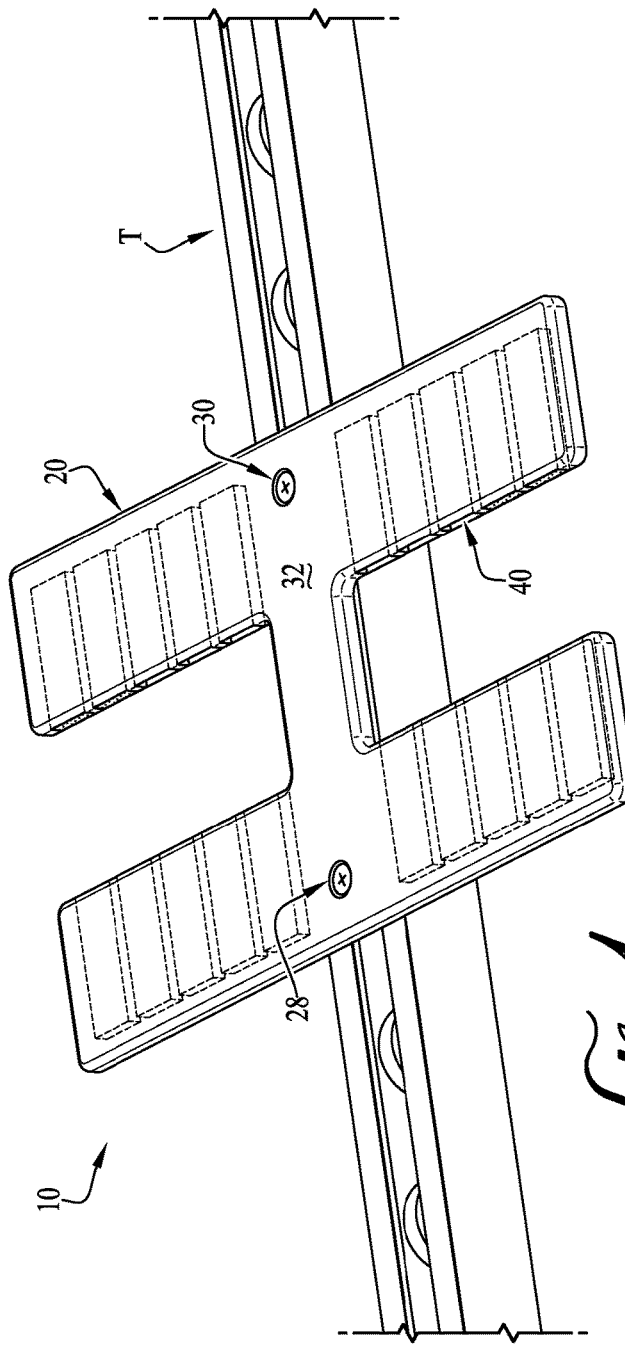

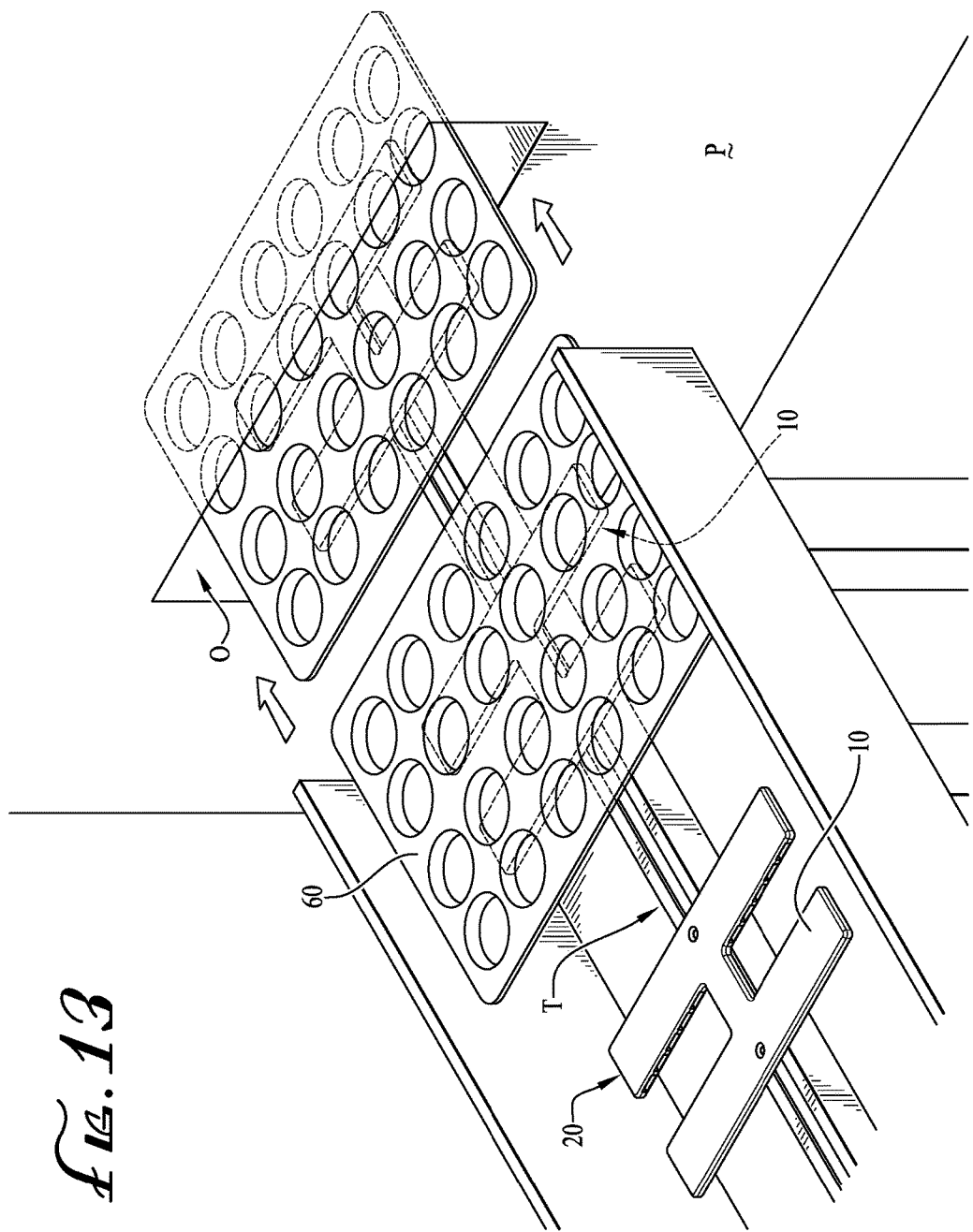

ADJUSTABLE MAGNETIC GRID FOR CONVEYOR SYSTEM

CROSS-REFERENCE TO RELATED APPLICATION

This application claims priority benefit of U.S. Provisional Patent Application Ser. No. 62/216,472 filed Sep. 10, 2015, the entirety of which is hereby incorporated herein by reference for all purposes.

TECHNICAL FIELD

The present invention relates generally to conveyor systems, and more particularly to an adjustable magnetic grid assembly for a conveyor assembly, for example for use in commercial baking systems.

BACKGROUND

Conveyor systems are used in various industries, such as for example in commercial baking systems. For example, in the baking industry, a metal container is filled with dough, and the conveyor system transports the metal container filled with dough through a proofer to proof the dough and through an oven to bake the dough. Conveyor systems for conveying metal objects, like the containers used in industrial baking, typically include a metal grid and a magnet assembly. Generally, the grid is attached to a drive assembly and includes at least one laterally extending support, such as a rail. The magnet assembly generally rests on the rail. The grid and the magnet assembly are usually separate structures made of welded stainless steel. Magnet assemblies known in the art typically include a magnetic circuit that generates a magnetic field having a magnetic flux along a contact surface of the magnet assembly. The metal object being conveyed is generally a metal, ferromagnetic container. The container is typically supported by the grid and the magnet assembly holds the container on the grid. Generally, a single conveyor system is used to transport metal containers of a varying shapes and sizes.

Traditional conveyor systems, such as that described above, are useful for conveying metal pans of dough through proofers and ovens. However, many such systems suffer from several disadvantages. For example, in many traditional conveyor systems, the magnets slam up to hold the metal pan to the grid when the metal pan is placed on the grid. This creates an impact on the pan, which disrupts the proofing of the dough. Extra gluten is often provided as a result. Further, repeated impacts can cause permanent deformations and defects to the pan and magnet assemblies. Another disadvantage of many traditional conveyor systems is that the locations of the magnets are not adjustable to accommodate metal pans of different sizes and configurations, e.g., pans having baking cups at different locations and of different diameters. In addition, the metal grid used in the traditional conveyor systems typically creates wear on the metal pans as it comes into contact with the surface of the metal pans.

Thus it can be seen that needs exist for improved conveyor systems. It is to the provision of an improved conveyor system meeting these and other needs that the present invention is primarily directed

SUMMARY

In example embodiments, the present invention provides an adjustable magnetic grid for a conveyor system. The magnetic grid of the present invention eliminates wear and tear on metal containers or pans placed on the grid and transported through the conveyor system. Locations of magnets in the magnetic grid are adjustable to accommodate metal containers of different sizes and configurations.

In one aspect, the present invention relates to a magnetic grid for a conveyor system that transports metal objects or containers. The magnetic grid includes a grid body that attaches to a drive assembly and at least one magnet incorporated into the grid body. The magnet holds the metal container onto the grid body as the grid transports the metal container in the conveyor system.

In another aspect, the present invention relates to an adjustable magnetic grid for a conveyor system transporting a metal container. The adjustable magnetic grid includes a grid body attached to a drive assembly. The grid body preferably includes a plurality of pockets. The adjustable magnetic grid further includes a plurality of magnets incorporated into the grid body through insertion into the pockets of the grid body. The magnets hold the metal container onto the grid body.

In still another aspect, the present invention relates to a method of transporting a metal container on a conveyor system. Steps include attaching a grid body that includes a plurality of pockets to a drive assembly such that the grid body presents a substantially flat top surface, inserting at least one magnet into one of the plurality of pockets in the grid body, and placing a metal container on the top surface of the grid body. The magnet holds the metal container in contact with the grid body.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 3 shows a cross section of the adjustable magnetic grid of FIG. 2.

FIG. 4 shows the adjustable magnetic grid attached to a conveyor system according to an example embodiment of the present invention.

FIG. 13 shows the adjustable magnetic grid in use in a proofing system.

DETAILED DESCRIPTION OF EXAMPLE EMBODIMENTS

The present invention may be understood more readily by reference to the following detailed description of the example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
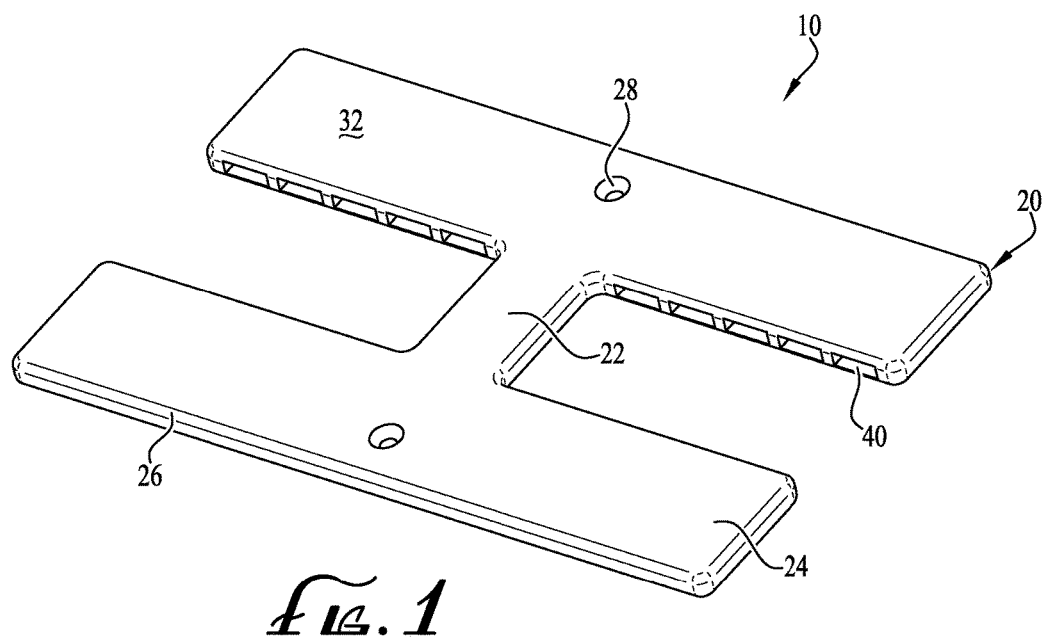
FIG. 1 shows a perspective view of an adjustable magnetic grid according to an example embodiment of the present invention.
Figure 2:
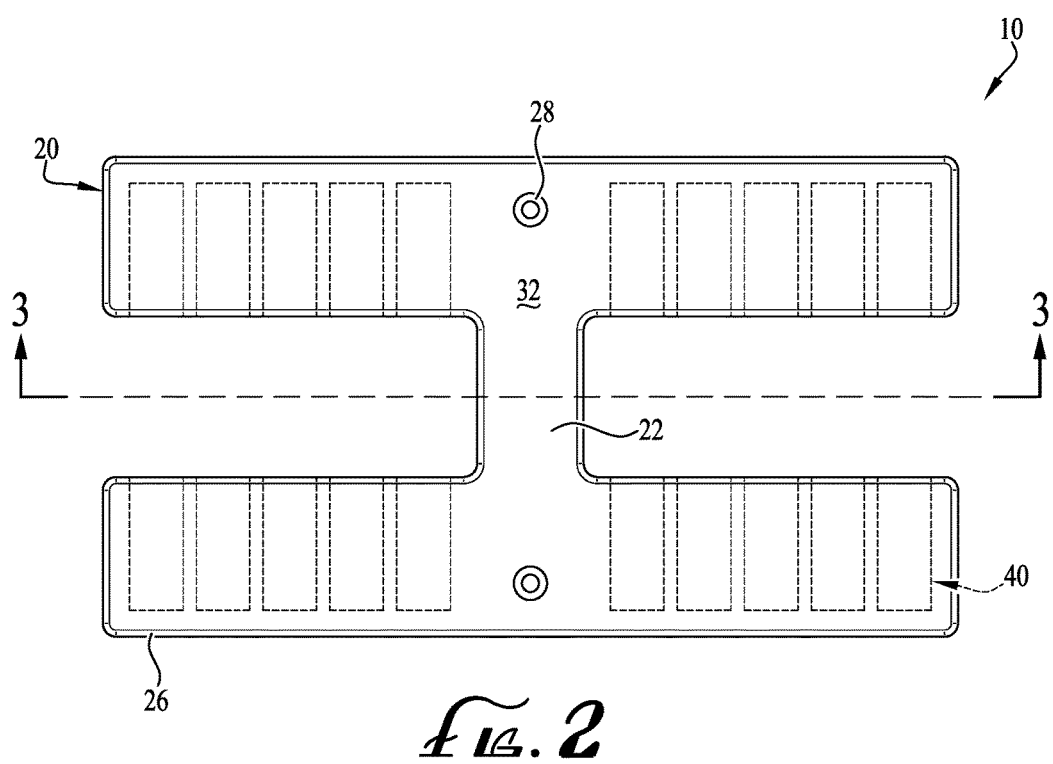
FIG. 2 shows a top view of the adjustable magnetic grid of FIG. 1.
Figure 5:
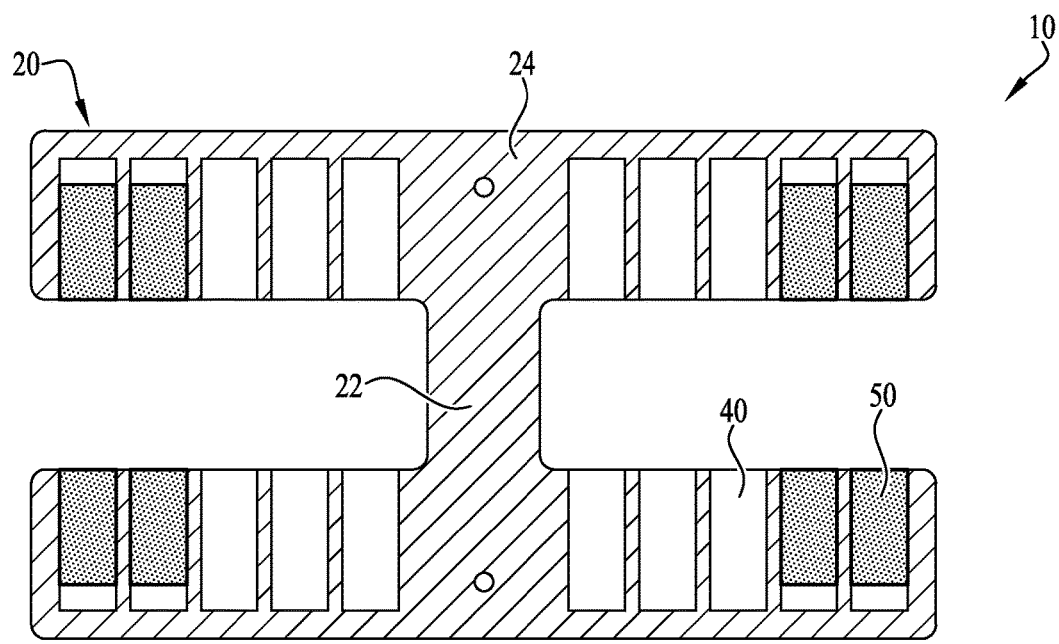
FIG. 5 shows the adjustable magnetic grid with magnet inserts in a first configuration according to an example embodiment of the present invention.

With reference now to the drawing figures, wherein like reference numbers represent corresponding parts throughout the several views, FIGS. 1-3 show an adjustable magnetic grid 10 for a conveyor system for conveying metal objects or containers according to an example embodiment of the present invention. For example, in particular embodiments, the conveyor system is used to convey metal baking trays or containers through a commercial baking system including for example a proofer stage and a baking oven stage. In example embodiments, the conveyor system includes one or more motor-driven conveyor belts or tracks.

The magnetic grid 10 generally includes a grid body 20 with a substantially flat profile or top surface 32 including at least one receiver or pocket 40 for containing a magnet or magnet cartridge (not shown). In the depicted embodiment, the body has a generally H-shaped periphery profile or cross section, having a central web 22 connecting two outer beams 24 extending parallel to one another and transverse from the central web. The pockets 40 are preferably shaped and sized to receive and retain the magnets or magnet cartridges described below, and to allow reconfiguration of the magnets into different configurations in different pockets depending on the desired application and use. In the depicted embodiment, the pockets 40 have a rectangular cross-section formed within an opening on the inside side walls of the beams 24. The pockets 40 are configured to detachably retain the magnets within the grid body 20. The adjustable magnetic grid 10 includes a plurality of magnet pockets 40 which allow the magnet cartridges to be re-positioned within the grid. The adjustable magnetic grid 10 of the present embodiment includes ten magnet pockets 40 on each beam 24. Two linear arrays of five pockets 40 each are located on each side of the web 22. In other embodiments, different numbers and configurations of pockets are used.

In example embodiments, the magnetic grid 10 includes radiused or curved edges 26 and counter-sunk screw holes 28. The curved edges 26 can help prevent sharp edges from scraping and damaging the metal containers being conveyed. The counter-suck screw or bolt holes 26 prevent metal screw heads from contacting or damaging the metal containers. In other embodiments, the body of the magnetic grid can have a rectangular, I-shape, circular or any other profile suitable for supporting the metal containers being conveyed. The pockets can also be positioned in or on any portion of the body suitable for creating a magnetic field attraction to engage the metal containers being conveyed. The grid body 20 can be formed as a single molded structure to eliminate crevices which could allow for the accumulation of organic matter. Alternatively, the grid body can be a multi-part assembly.

In the depicted embodiment, the body 20 has an overall length of about 16 inches and a width of about 9 inches. The width of each beam is about 3 inches. The grid body 20 generally has a large surface area compared to the metal object or container being conveyed to help prevent wear and tear on the metal container. In alternate embodiments, the body 20 is any size suitable for supporting the object being conveyed in the desired conveyor system. In the depicted embodiment, each pocket 40 is about 2.5 inches long and about 1 inch wide. In alternate embodiments, the pocket is any size suitable to receive and retain a magnet cartridge. In the example embodiment, the grid body 20 is formed of a plastic material, for example polypropylene, polyoxymethylene, and polytetrafuoroethylene (also known as Teflon) or other materials. The grid body 20 can also be formed from a resin, for example an acetal homopolymer resin like DuPont™ Delrin®. The plastic and resin materials allow flexibility in the beams 24 of the grid body 20 such that the grid body will bend to conform to a metal container that is not completely flat. The flexibility of the body 20 also reduces the impact force when the metal container is placed on the magnetic grid 10.

As shown in FIG. 4, in a conveyor system at least one magnetic grid 10 is disposed on a track T of a drive assembly. Bolts or screws 30 inserted through the counter-sunk holes 28 secure the grid 10 to the track T. In alternate embodiments, the grid 10 is push fitted, clipped or otherwise secured to the track T using any conventional attachment mechanism. In example embodiments, the grid 10 is generally secured to the track T at its midpoint along the central web 22 such that the grid 10 is generally centered on the drive mechanism, with the length of the grid positioned generally perpendicularly to the track.

Figure 6:
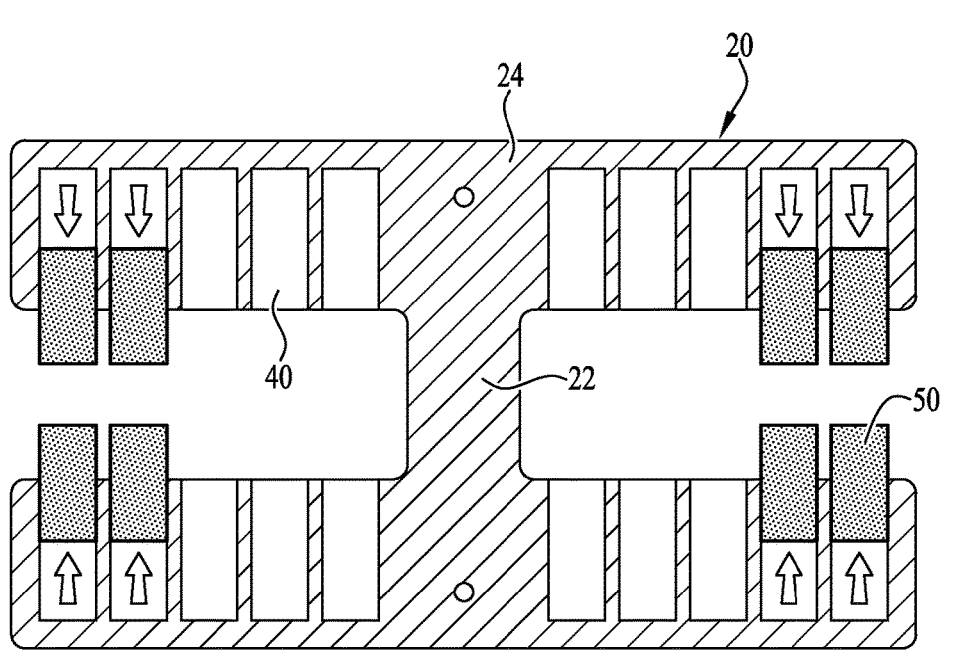
FIG. 6 shows the adjustable magnetic grid of FIG. 5 with magnets being removed from pockets.
Figure 7:
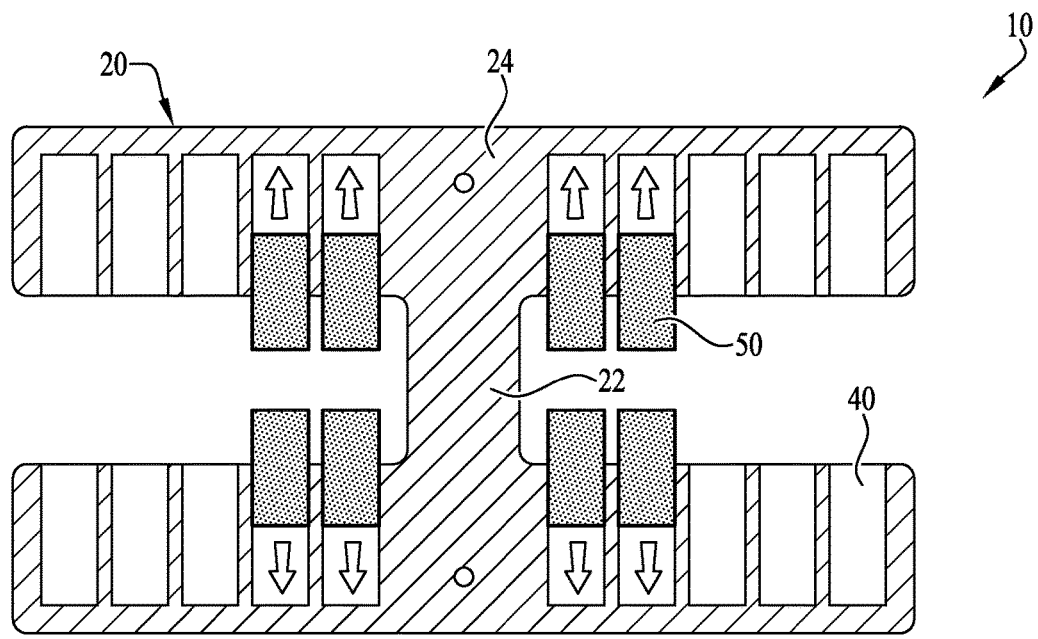
FIG. 7 shows the adjustable magnetic grid with magnets being inserted into pockets in a different second configuration according to an example embodiment of the present invention.
Figure 8:
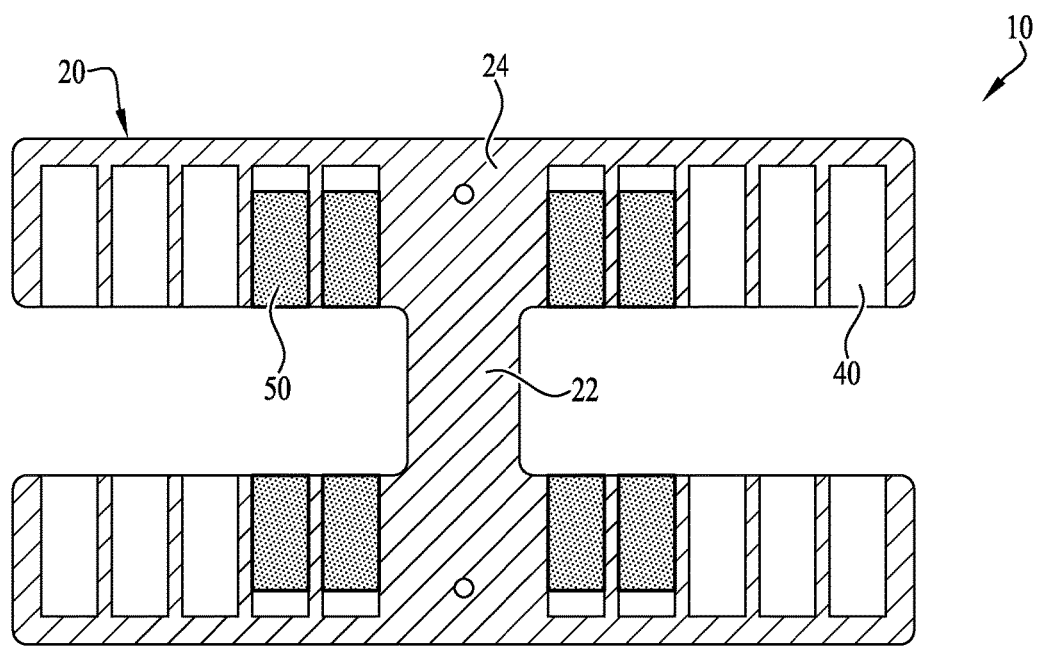
FIG. 8 shows the adjustable magnetic grid with magnet inserts in a different second configuration according to an example embodiment of the present invention.

FIGS. 5-8 show the placement of magnet cartridges 50 within the adjustable magnetic grid 10. The magnets 50 are generally arranged such that two magnets are placed in adjacent pockets 40 and oriented in an N-S manner. The magnets 50 generate a magnetic field or attraction having a magnetic flux along the contact surface of the magnets. This results in an increase in efficiency in securing magnetically-attracted metal objects such as a metal baking pan or container to the grid 10. When the metal container is conveyed within the conveyor system, the container is supported by the adjustable magnetic grid 10 and the magnets 50 within the grid body 20 hold the container on the grid. The magnet cartridges 50 are modularly adjustable or repositionable to accommodate metal containers of different shapes and sizes. In the configuration depicted in FIG. 5, four pairs of magnets 50 are placed in a first configuration in the outermost pockets 40 on each beam 24 of the body 20 of the adjustable magnetic grid 10. Some containers used may not be large enough or have contact surfaces to correspond with the positioning of the magnets 50 in the outermost pockets 40 of the adjustable grid 10. To adjust the configuration of the magnetic grid 10, the magnets 50 are removed from the pockets 40 of the first configuration, as shown in FIG. 6. The magnets 50 can be reinserted into different pockets 40 (more inwardly along the beams 24) in a second configuration, as shown in FIG. 7 to create the magnetic grid configuration shown in FIG. 8. The magnets 50 can be placed in pockets 40 at any point along the beam 24, or at any point in the magnetic grid body 20, to accommodate a variety of metal containers.

Figure 9:
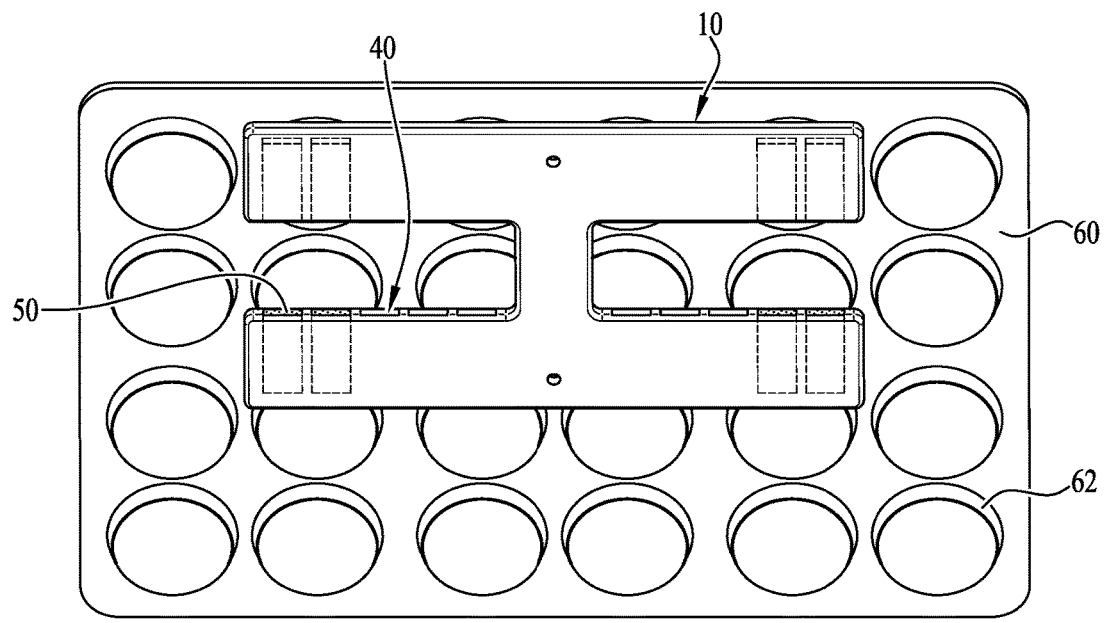
FIG. 9 shows the adjustable magnetic grid with the magnet insert configuration of FIG. 5 attached to a metal baking container according to an example embodiment of the present invention.
Figure 10:
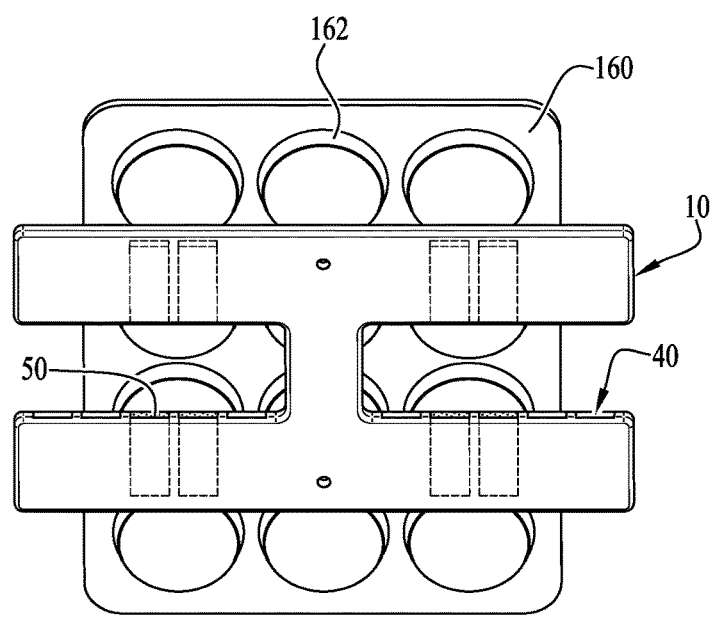
FIG. 10 shows the adjustable magnetic grid with magnet inserts in a different configuration attached to another type of metal baking container according to an example embodiment of the present invention.
Figures 11, 12:
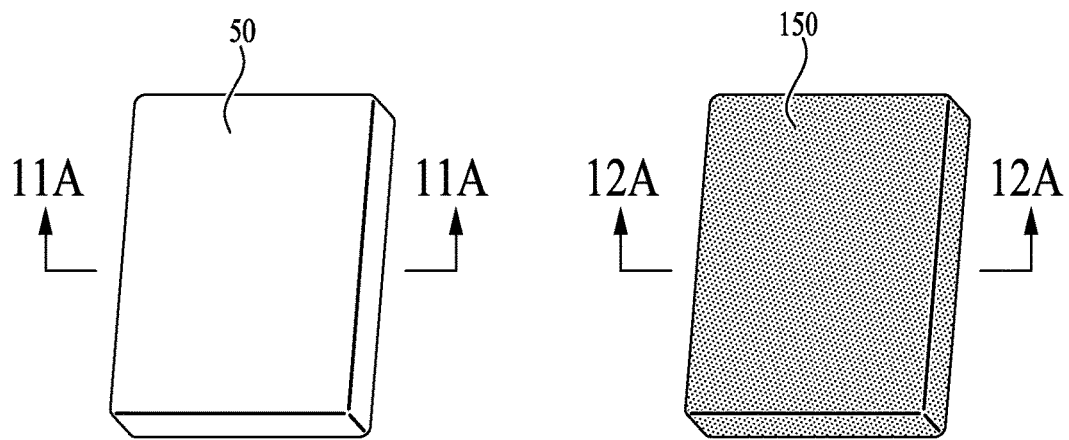
FIG. 11 shows a magnet cartridge for use in the adjustable magnetic grid according to an example embodiment of the present invention.
FIG. 12 is a magnet cartridge according to another example embodiment of the present invention.
Figure 11A:
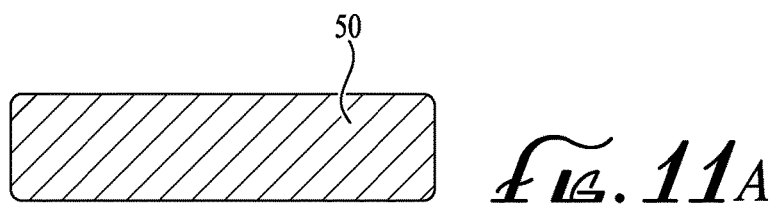
FIG. 11A shows a cross section of the magnet cartridge of FIG. 11.
Figure 12A:
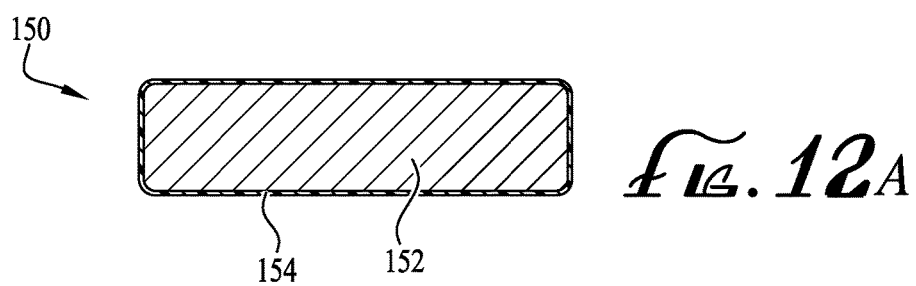
FIG. 12A shows a cross section of the magnet cartridge of FIG. 12.

FIGS. 9 and 10 illustrate the adjustable magnetic grid 10 attached to metal containers 60, 160 in the form of baking pans of different size configurations. The adjustability of the magnet 50 locations is particularly important in a conveyor system used for proofing and baking, as the containers 60, 160 often include cups 62, 162 or other indentions and therefore do not have a completely flat profile. For the metal container 60 illustrated in FIG. 9, the magnets 50 are placed in the outer most pockets 40 to align with the bottom of the cups 62 of that container. The container 160 illustrated in FIG. 10 is relatively smaller than that of FIG. 9. If the magnets 50 were placed in the outer most pockets 40, they would not align with a contact surface of that metal container 160. The magnets 50 are moved to pockets 40 closer to the center of the grid 50 to align with the cup 62 position on the smaller metal container 160.

FIGS. 11, 11A, 12 and 12A show magnet cartridges 50, 150 according to example embodiments of the present invention. FIG. 9 shows a nickel plated, neodymium rare earth magnet 50 with a metal outer surface. In other embodiments, the magnet cartridge 50 can be constructed of any material sufficient to create a magnetic field. The magnet cartridge 50 of the present embodiment is rectangular. In other embodiments, the magnet cartridge is any size or shape to correspond with the pockets on the grid body. The magnet 150 of FIG. 10 is generally the same size and shape as the magnet 50 of the previous embodiment. This magnet 150 differs in one respect in that it is a magnet 152 surrounded by an epoxy coating 154. The epoxy coating 154 can double the life expectancy of the magnet and prevents damage to the magnet and contacted equipment or containers. The magnet cartridges 50, 150 can also include copper in addition to nickel.

FIG. 13 shows the adjustable magnetic grid 10 on a conveyor system track T supporting metal containers 60 being fed into a baker or proofer P according to an example form of the invention. In the depicted embodiment, the grid body 20 has a small thickness relative to its length and width, giving the grid body a substantially flat profile. The flat profile assists in supporting metal containers 60 through the low clearance opening or entrance O to the proofer P. In other conveyor systems, a thicker grid body may be desirable.

In example methods of use, a user attaches the adjustable magnetic grid body 20 to the track T of the drive system of a conveyor. The grid 10 is attached so that the top surface 32 of the grid body 20 presents a generally flat, unobstructed surface for placing a metal container 60 onto. Magnet cartridges 50 are inserted into pockets 40 on the grid body 20 positioned in a first configuration to accommodate the size, shape and other features of the metal container 60 to be conveyed. In the depicted embodiment, pairs of magnets 50 with N-S orientations are placed in adjacent pockets 40 to create the magnetic field required to hold a metal container 60. The metal container 60 is placed on the top surface 32 of the grid body 20. The drive assembly moves the adjustable magnetic grid 10 and metal container 60 through the conveyor system. When the metal container 60 has completed its path though the conveyor system, the metal container is lifted to disengage from the adjustable magnetic grid 10. To adjust the position of the magnets 50, the magnets are removed from the current pockets 40 and reinserted into pockets at a different position on the grid body 20 in a different second configuration corresponding to the desired container to be carried.

While the claimed invention has been shown and described in example forms, it will be apparent to those skilled in the art that many modifications, additions, and deletions can be made therein without departing from the spirit and scope of the invention as defined by the following claims. For example, although in the embodiments described above, the magnetic grid assembly is described with respect to use in a proofing/baking conveyor system, it should be appreciated that the invention may be applicable to conveyor systems in other industries.

What is claimed is:

1. An adjustable magnetic grid for a conveyor system comprising:
    a grid body attached to a drive assembly, the grid body having an H-shaped configuration comprising a central web connecting two outer beams, the outer beams being generally perpendicular to the central web and being generally parallel to and spaced a distance apart from one another, the grid body further comprising a top surface and a plurality of pockets formed in the outer beams, wherein each pocket comprises an opening;
    a plurality of magnets incorporated into the grid body, wherein the magnets are configured for removable engagement within the pockets of the grid body, wherein the magnets are reconfigurable to different positions on the grid body, and wherein the plurality of magnets are inserted into the pockets through the openings in a lateral movement parallel to the top surface of the grid body.

2. The adjustable magnetic grid of claim 1, wherein the plurality of pockets comprise arrays of pockets formed on inside side walls of the outer beams on each side of the central web of the H-shaped grid body.

3. The adjustable magnetic grid of claim 1, wherein each of the plurality of arrays comprises at least two pockets.

4. The adjustable magnetic grid of claim 3, wherein each of the plurality of arrays comprises five pockets.

5. The adjustable magnetic grid of claim 1, wherein the magnets include pairs of magnets in an N-S orientation.

6. The adjustable magnetic grid of claim 1, wherein the top surface of the grid body is substantially flat.

7. The adjustable magnetic grid of claim 1, wherein at least one magnet is coated in epoxy.

8. A method of transporting a metal container on a conveyor system comprising:
- attaching a grid body to a track of a drive assembly such that the grid body presents a continuous flat top surface, wherein the grid body includes a plurality of pockets;
- inserting at least one magnet into one of the plurality of pockets in the grid body such that the at least one magnet is positioned under the flat top surface of the grid body;
- placing the metal container on the top surface of the grid body, wherein the at least one magnet holds the metal container in contact with the grid body; and
- wherein the one or more magnets are moved to different pockets on the grid body depending on the size and shape of the metal container.

9. The method of claim 8, wherein the metal container is a baking tray.

* * * * *